United States Patent
Lee et al.

(10) Patent No.: US 8,135,845 B2
(45) Date of Patent: Mar. 13, 2012

(54) TERMINAL UNIT FOR HANDLING SESSION ON THE BASIS OF SESSION INITIATION PROTOCOL, METHOD OF TRANSMITTING AND RECEIVING THEREOF

(75) Inventors: Hyung-Jin Lee, Seoul (KR); Bo-Wook Cho, Seoul (KR); Chan-Min Park, Seoul (KR)

(73) Assignee: KT Corporation, Seongnam (KR)

( * ) Notice: Subject to any disclaimer, the term of this patent is extended or adjusted under 35 U.S.C. 154(b) by 0 days.

(21) Appl. No.: 12/530,169

(22) PCT Filed: Apr. 10, 2008

(86) PCT No.: PCT/KR2008/002020
§ 371 (c)(1),
(2), (4) Date: Sep. 4, 2009

(87) PCT Pub. No.: WO2008/127018
PCT Pub. Date: Oct. 23, 2008

(65) Prior Publication Data
US 2010/0023625 A1    Jan. 28, 2010

(30) Foreign Application Priority Data
Apr. 11, 2007 (KR) .................. 10-2007-0035472

(51) Int. Cl.
*G06F 15/16* (2006.01)

(52) U.S. Cl. ........... 709/227; 714/39; 370/342; 370/352
(58) Field of Classification Search ................ 709/227; 714/39; 370/352, 342
See application file for complete search history.

(56) References Cited

U.S. PATENT DOCUMENTS
2003/0227880 A1    12/2003    Heller et al.
2006/0209775 A1     9/2006    Lim et al.

FOREIGN PATENT DOCUMENTS
KR    10-2005-0063416 A    6/2005
WO    2006/096023 A1       9/2006

OTHER PUBLICATIONS
Written Opinion dated Jul. 15, 2008 of parent application PCT/KR2008/002020 filed on Apr. 10, 2008—4 pages.
International Search Report dated Jul. 15, 2008 of parent application PCT/KR2008/002020 filed on Apr. 10, 2008—3 pages.

*Primary Examiner* — Adnan Mirza
(74) *Attorney, Agent, or Firm* — Knobbe Martens Olson & Bear LLP

(57) ABSTRACT

According to the present invention, a service is configured by a plurality of sessions and respective session negotiation requests defined by different media formats can be performed without influencing existing connected sessions, and hence it is easy to add, delete, and change the media, the contact of session negotiation can be specified, and the response to the session negotiation request can be processed easily with the service acceptance or rejection of the contact.

9 Claims, 9 Drawing Sheets

TERMINAL UNIT FOR HANDLING SESSION ON THE BASIS OF SESSION INITIATION PROTOCOL, METHOD OF TRANSMITTING AND RECEIVING THEREOF

TECHNICAL FIELD

The present invention relates to a session initiation protocol (SIP)-based session processing terminal device and a session negotiation request transmitting/receiving method using the same. Particularly, the present invention relates to an SIP-based session processing terminal device for using the IP multimedia subsystem (IMS) service, and a session negotiation request transmitting/receiving method using the same.

BACKGROUND ART

The IMS is an all Internet protocol (ALL-IP)-based core network for combining wired and wireless environments, and is an infrastructure for providing multimedia services. The IMS was first proposed by the 3rd Generation Partnership Project (3GPP) group for developing international standards for radio communication.

The major motive for using the All-IP-based network through the IMS is to combine many contents and new service performance through a packet service. That is, the basic service target desired by the IMS is to provide multimedia such as voice, audio, video, and data in a complex manner based on the IP protocol, and also to build an infrastructure allowing quick service development and modification.

In order to provide the IMS service, a session is established after performing a negotiation process for transmitting and receiving capabilities or preferences between end users. After the session is established, a bearer is formed between the end users' terminals to thus allow data communication.

The IMS uses the SIP protocol provided by the Internet engineering task force (IETF) so as to establish the above-noted session.

The SIP is an application-level signaling protocol that has specified the process for intelligent terminals attempting to communicate on the Internet to identify each other, find their positions, and generate, delete, or modify multimedia communication sessions between them.

In the SIP-based communication, a call sending person transmits and receives text messages to/from a call receiving person, and the actual contents of the established session are described while including at least one of media formats such as the audio, video, and text in the message.

In this instance, the session is established in correspondence to the service. That is, a session is established between the call sending person and the call receiving person so as to provide a specific service. When attempting to change negotiation information of the session because of addition of media, the established session negotiation is performed again through a re-INVITE message for the existing session.

However, the re-negotiation process for the session is very complicated. For example, when a receiving person who has requested to re-negotiate the session cannot accept a newly defined media format, the receiving person notifies the call sending person of the fact that he cannot accept the re-negotiation-requested media format, and he performs a complex process for negotiating the session according to the media format available for both persons.

Accordingly, it is restricted to change the detailed contents of the service when the session is once connected in a like manner of adding various media formats during participation in a session.

For example, it is not easy to add video media to 3 persons from among 5 persons who are participating in a chatting service session since the media format of the negotiated chatting service session must be changed.

Also, when a person from among those who are requested to re-negotiate an addition of the video media rejects the addition of the media, the existing chatting service session may be terminated or another negotiation may be required.

Further, when the person participates in the video service session, terminates the video service, and then attempts to switch to the chatting service, it is burdensome because he must perform a re-negotiation process for defining the media format of the session.

In addition, when a problem occurs during the session re-negotiation process, the existing service he is joining and a new service he desires to join may generate problems.

However, when considering that the characteristic of the IMS service is to combinatively provide various multimedia having different media formats, a service is configured with various media formats, and hence, the session will be frequently re-negotiated while the session is connected.

Therefore, since the conventional session negotiation method limits provision of complex multimedia services configured with various media formats, it is needed to provide a session processing scheme appropriate for the characteristic of the IMS service that has minimized the limit.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a terminal device for performing an SIP-based session process for realizing a service with at least one session, and a session negotiation request transmitting and receiving method using the same.

The present invention has been made in another effort to provide a terminal device for performing an SIP-based session process for requesting session negotiation including a session mapping identifier for indicating a connection state between at least one session, and a session negotiation request transmitting and receiving method using the same.

The present invention has been made in another effort to provide a terminal device for performing an SIP-based session process for mapping connected sessions on a service application by using a session mapping identifier for indicating a connection state between at least one session, and a session negotiation request transmitting and receiving method using the same.

The present invention has been made in another effort to provide a terminal device for performing an SIP-based session process by including a session mapping identifier for indicating a connection state between at least one session into a predefined specific header field in a message header for requesting session negotiation, and a session negotiation request transmitting and receiving method using the same.

The present invention has been made in another effort to provide a terminal device for performing an SIP-based session process by including a session mapping identifier for indicating a connection state between at least one session into a newly defined field in a message header for requesting session negotiation, and a session negotiation request transmitting and receiving method using the same.

Technical Solution

An exemplary embodiment of the present invention provides a terminal device for performing a session initiation protocol (SIP)-based session process including: a call sending processor for activating at least one session for providing a service requested by a user, and transmitting a negotiation request of the activated session including a session mapping identifier for indicating a connection state between sessions to a base station; and a call receiving processor for mapping at least one received session negotiation request on a corresponding service application by using the session mapping identifier included in at least one session negotiation request received from the base station.

Another embodiment of the present invention provides a method for transmitting an SIP-based session negotiation request, including: activating at least one session for providing a service according to a user's request; selecting a session mapping identifier for the at least one activated session, the session mapping identifier indicating a connection state between sessions; and including the selected session mapping identifier into the at least one activated session negotiation request, and transmitting the same.

Yet another embodiment of the present invention provides a method for receiving an SIP-based session negotiation request including: receiving at least one session negotiation request; checking a session mapping identifier included in the at least one received session negotiation request, the session mapping identifier indicating a connection state between sessions; and mapping the at least one received session negotiation request on a corresponding service application by using the session mapping identifier.

Advantageous Effects

According to the exemplary embodiment of the present invention, it is easy to add, delete, and modify the media by configuring a service into a plurality of sessions since it is possible to request additional session negotiation having a differently defined media format without influencing the existing connected session. Further, it is possible to specify the contact of the session negotiation request.

Also, when the service is configured with a single session in a like manner of the prior art and the contact's terminal device cannot accept session re-negotiation, the problem of influencing the existing session under participation, such as disconnection of the existing session because of the complexity of the re-negotiation process, is overcome.

Further, it is possible to process the response to the session negotiation request by using the contact's acceptance/rejection without conventional complex session re-negotiation.

Also, since the session mapping identifier for indicating the connection state between a plurality of sessions configuring a single service is defined by using a specific header field of the SIP message, message extendibility with the existing SIP protocol is provided.

In addition, compatibility with the existing SIP protocol is provided since the terminal device using a standard having an undefined session mapping identifier neglects it.

BEST MODEL

Figure 1:
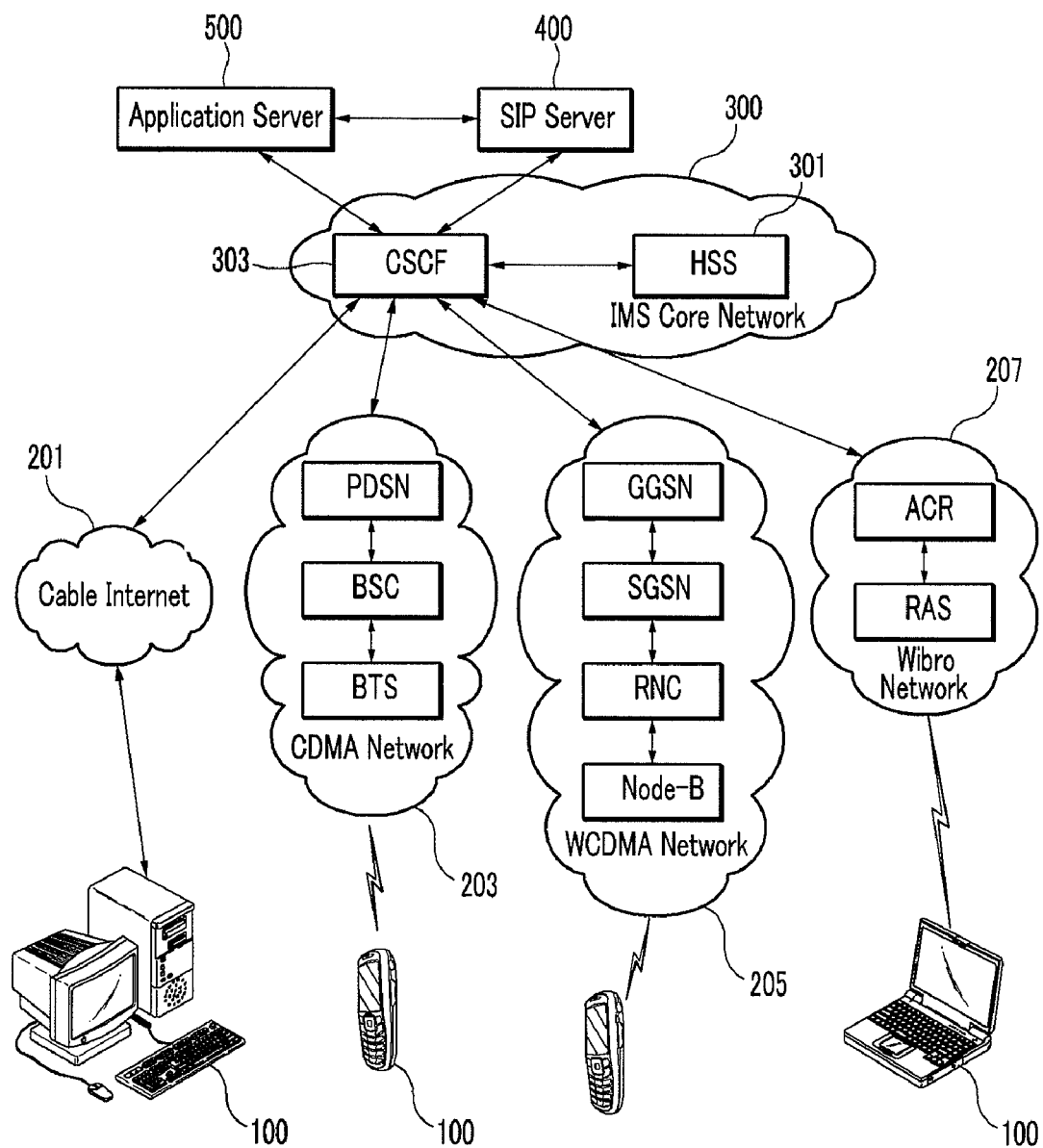
FIG. 1 shows a schematic diagram of a network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, unless explicitly described to the contrary, the word "comprise" and variations such as "comprises" or "comprising" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

An SIP-based session processing terminal device and a session negotiation request transmitting/receiving method using the same according to an exemplary embodiment of the present invention will now be described with reference to the accompanying drawings.

FIG. 1 shows a schematic diagram of a network according to an exemplary embodiment of the present invention.

Referring to FIG. 1, the ALL IP network configuration is realized based on the SIP protocol, and includes a terminal device 100, an IMS core network 300, an SIP server 400, and an application server 500, which will now be described.

The terminal device 100 includes all devices that are targets of the IMS service using the SIP. Also, the terminal device 100 includes at least one SIP-based IMS service application, and it establishes a session with a terminal of the contact according to the SIP rule through the IMS service application, and communicates with the terminal. Here, the acronym SIP stands for "session initiation protocol", and represents an application layer control protocol for generating, modifying, and terminating multimedia sessions or calls between at least one terminal on the Internet protocol-based network.

The terminal device 100 can be various types of terminals according to the access network, and here, the access network includes: a cable Internet network 201; a CDMA network 203 including a base transceiver station (BTS), a base station controller (BSC), and a packet data service node (PDSN); a WCDMA (UMTS) network 205 including a node B (node-B), a radio network controller (RNC), a serving GPRS service node (SGSN), and a gateway GPRS support node (GGSN); and a WiBro network 207 including a WiBro radio access station (RAS) and an access control router (ACR).

The IMS core network 300 manages the session by using the SIP/SDP protocol provided by the Internet engineering task force (IETF). In detail, the IMS core network 300 includes a home subscriber server (HSS) 301 for storing user information and user's service profile information on the IMS network, and a call session control function (CSCF) unit 303 for managing service control and providing streaming service resource information to the user.

Here, the CSCF unit 303 transmits/receives an SIP message to/from the terminal device 100 through the access network, and forwards an IMS service call to the SIP server 400 and the application server 500 through the SIP message so that the SIP-based IMS service may be provided.

The SIP server 400 processes the SIP message forwarded by the CSCF unit 303, and includes a proxy server, a register server, and a redirection server (not shown in the drawing). Here, the proxy server determines where to transmit the requests provided by the terminal devices 100 to either directly service them or transmit them to other servers. Also, the register server receives and processes a register request, and the redirection server provides location information to a user agent in response to the request and does not control the access setting. In this instance, the proxy server, the register server, and the redirection server are developed as independent application programs or as a single application program for combining all the servers' functions.

The application server 500 is an application layer server for providing an SIP-based large capacity multimedia service using the IMS, and it provides an SIP-based IMS service application and includes user service logic.

The application server 500 can be a server for providing complex multimedia services including instant messaging (IM)-based chatting, file transmission, and video sharing.

Also, the application server 500 can be a plurality of application servers 500 corresponding to a single service.

A terminal device for providing an SIP-based service through at least one session on the IMS network and a corresponding session processing method will now be described.

Figure 2:
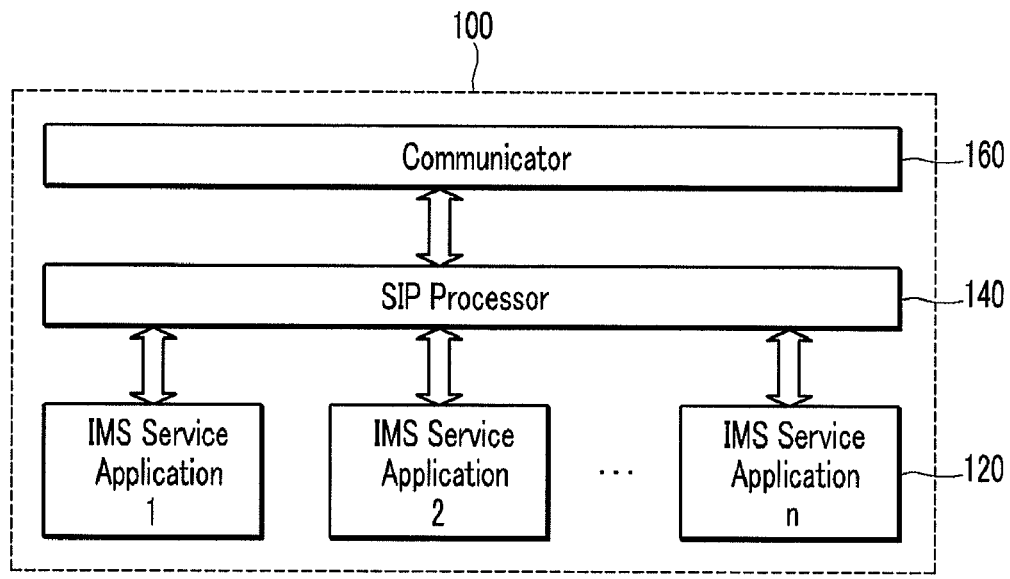
FIG. 2 shows a block diagram of a terminal device for processing an SIP-based session according to an exemplary embodiment of the present invention.

FIG. 2 shows a block diagram of a configuration of a terminal device for processing SIP-based sessions according to an exemplary embodiment of the present invention.

Referring to FIG. 2, the terminal device 100 includes at least one IMS service application unit 120, an SIP processor 140, and a communicator 160.

The IMS service application 120 can be plural corresponding to the respective IMS services provided by the terminal device 100. The IMS service application 120 is connected to the application server 500 for providing a corresponding service to request the service and receive corresponding service data. The IMS service application 120 processes the data output by the SIP processor 140 according to the characteristics of the corresponding service, and outputs the data that are input through a user interface (not shown in the drawing) to the SIP processor 140.

The IMS service application 120 requests the SIP processor 140 to activate a session according to the user's service request.

The SIP processor 140 is a layer for processing the SIP protocol, and sets the SIP session according to the session activation request transmitted by the IMS service application 120 and performs communication. That is, the SIP processor 140 requests session negotiation, and responds to the received request.

In this instance, the SIP processor 140 activates at least one session according to the session activation request transmitted by the IMS service application 120 to request session negotiation. Also, the SIP processor 140 receives at least one session negotiation request from the terminal device of the contact through the IMS network 300, and maps the at least one received session negotiation request on the corresponding IMS service application 120. The SIP processor 140 will be described in further detail with reference to FIG. 3.

The communicator 160 performs a communication function corresponding to the lower layer of the SIP protocol layer, and transmits/receives signals to/from the node that configures the IMS network 300. The communicator 160 includes: hardware including an RF circuit and a baseband circuit; and a physical layer, a link layer, an IP layer, and a TCP layer for performing subsequent processes of the hardware.

Figure 3:
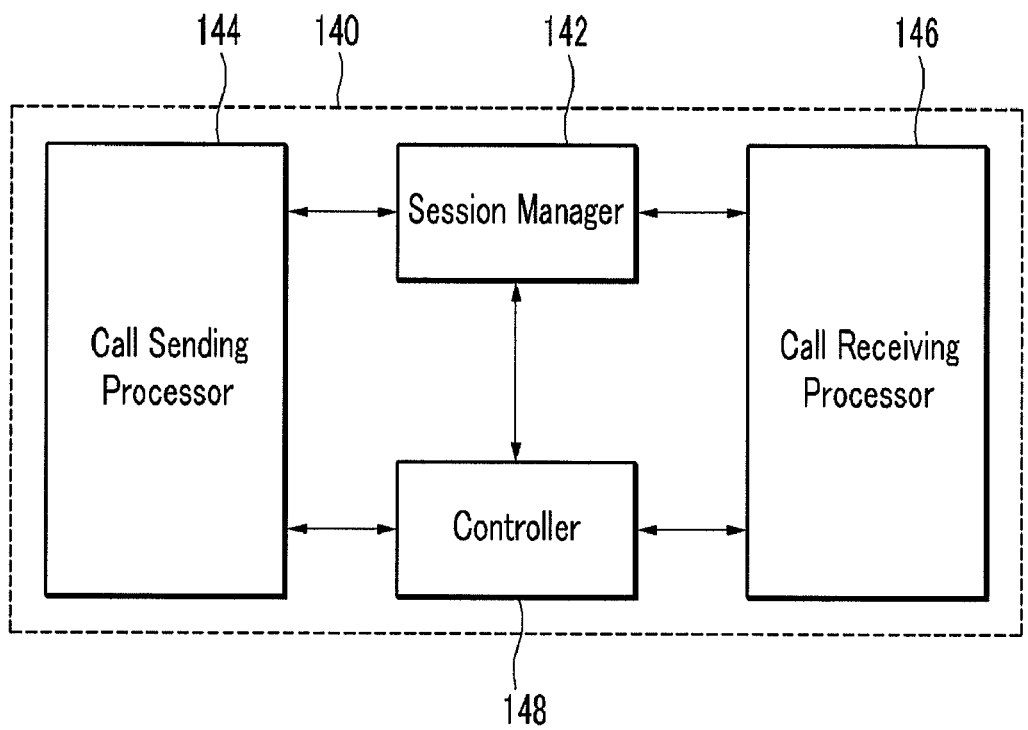
FIG. 3 shows a detailed block diagram of a terminal device for processing an SIP-based session according to an exemplary embodiment of the present invention.

FIG. 3 shows a block diagram of a terminal device for processing an SIP-based session according to an exemplary embodiment of the present invention. That is, FIG. 3 shows the configuration of the SIP processor 140.

Referring to FIG. 3, the SIP processor 140 includes a session manager 142, a call sending processor 144, a call receiving processor 146, and a controller 148.

The session manager 142 manages information on the participated session, and the user's session state. The participated session information is provided by the SIP server 400. In this instance, the session information is SIP dialog information defined by the IETF RFC3261 and includes a Call-ID, a dialog ID including a local tag and a remote tag, a local uniform resource identifier (URI), a remote URI, and a dialog state for indicating a session state with the session contact. The session information is used as information for determining whether the session that is activated according to the session activation request relates to the session that is generated and participated.

The call sending processor 144 is a configuration corresponding to a user agent client (UAC) for initializing the SIP request. That is, the call sending processor 144 transmits at least one session negotiation request according to the session activation request by the IMS service application 120. In this instance, a session mapping identifier for indicating a mutual connection state between a plurality of sessions is inserted into the transmitted session negotiation request.

The call receiving processor 146 performs the function of a user agent server (UAS) for receiving the SIP request and returning a corresponding response. That is, the call receiving processor 146 receives at least one session negotiation request including a session mapping identifier for indicating a connection state between a plurality of sessions from the terminal of the contact. The call receiving processor 146 checks the session connected to the session negotiation request that is received by using the session mapping identifier, and maps the same on the IMS service application 120.

The controller 148 includes the standard SIP protocol stack following the IETF RFC3261, and encodes/decodes and transmits/receives the SIP message. The controller 148 operates the session manager 142, the call sending processor 144, and the call receiving processor 146 to process the SIP protocol function required for the session manager 142, the call sending processor 144, and the call receiving processor 146.

Figure 4:
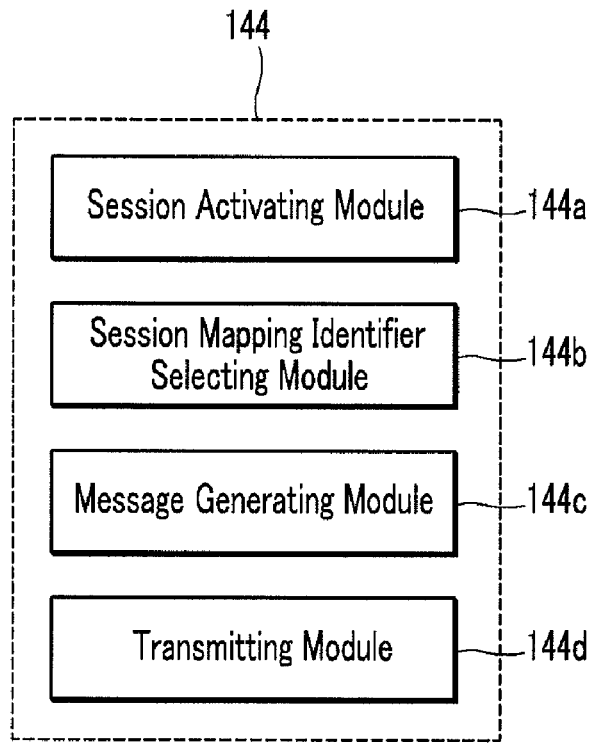
FIG. 4 shows a block diagram of a terminal device for transmitting an SIP-based session negotiation request according to an exemplary embodiment of the present invention.

FIG. 4 shows a block diagram of a terminal device for transmitting an SIP-based session negotiation request according to an exemplary embodiment of the present invention. That is, FIG. 4 shows a detailed configuration of the call sending processor 144 shown in FIG. 3.

Referring to FIG. 4, the call sending processor 144 includes a session activating module 144a, a session mapping identifier selecting module 144b, a message generating module 144c, and a transmitting module 144d.

The session activating module 144a activates at least one session according to the session activation request transmitted by the IMS service application 120, and checks the connection state of the activated session. That is, the session activating module 144a checks the connection state between the activated session and the participated session or the connection state of a plurality of activated sessions.

In this instance, the session activating module 144a checks the connection state between the activated session and the participated session by using the participated session information managed by the session manager 142.

The session mapping identifier selecting module 144b selects a session mapping identifier by referring to the connection state checking result of the session activating module 144a.

Here, the session mapping identifier is configured as a random number that has no specific arrangement order or rule and is consecutive.

The random number is selected by the subsequent two exemplary embodiments. The first one is to use a random number table and the second one is to use a value that is operated through the hashing algorithm. Here, the random number table includes random numbers used for random extraction. Further, the hashing algorithm is an operation method using the hash function having the characteristic in which a factor cannot be inferred from the resultant value, and it has no probability of generating the same resultant values in a like manner of the random number table. Proper information (e.g., an IMSI number) given to the terminal device 100 can be used for the factor of the hashing algorithm.

The message generating module 144c generates a message for requesting negotiation of the session activated by the session activating module 144a. An SIP message defined by the SIP rule is used for the generated message.

Here, the SIP message following the SIP rule is divided into a request message generated by a UAC and a response message generated by a UAS. The request message includes INVITE, ACK, CANCLE, OPTIONS, and REGISTER. Also, the response message includes 1xx, 2xx, 3xx, 4xx, 5xx, and 6xx messages. The 4xx and 6xx messages are used for a negative response, that is, a rejection response to the request.

The message generating module 144c generates at least one INVITE message for requesting negotiation of the activated session. The message generating module 144c inserts the session mapping identifier selected by the session mapping identifier selecting module 144b into a specific header field of the generated INVITE message. In this instance, a subject field can be used for the specific header field into which the session mapping identifier is inserted.

The transmitting module 144d transmits a message generated by the message generating module 144c.

Figure 5:
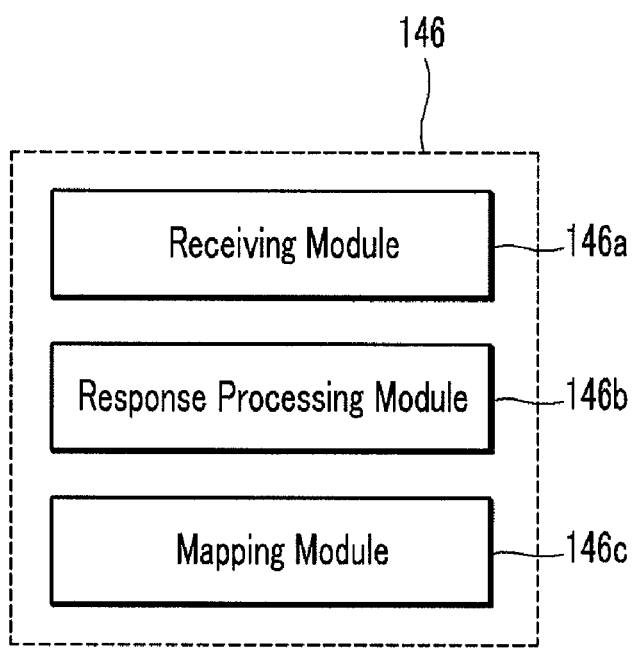
FIG. 5 shows a block diagram of a terminal device for receiving an SIP-based session negotiation request according to an exemplary embodiment of the present invention.

FIG. 5 shows a block diagram of a terminal device for receiving an SIP-based session negotiation request according to an exemplary embodiment of the present invention. That is, FIG. 5 shows a detailed configuration of the call receiving processor 146 of FIG. 3.

Referring to FIG. 5, the call receiving processor 146 includes a receiving module 146a, a response processing module 146b, and a mapping module 146c.

The receiving module 146a receives a message for requesting at least one session negotiation including a session mapping identifier from the terminal device of the contact who desires to acquire a session. As described in FIG. 4, the receiving module 146a receives at least one INVITE message having a specific header field in which a session mapping identifier is inserted.

The response processing module 146b responds to at least one session negotiation request received by the receiving module 146a. That is, the response processing module 146b checks whether to accommodate performance information defined in the SDP field of the INVITE message, determines whether to negotiate the requested session, and transmits a corresponding response message. Here, the performance information includes media characteristic information including a media type or a codec of the service to be provided through session negotiation.

In this instance, when session negotiation is available, the performance information for the requested session negotiation is included in the response message and is then transmitted to thus process the acceptance response to the INVITE message. The used response message can be a 183 session progress message.

Also, when the session negotiation is not available, the response for rejecting a session negotiation request can be processed by using a 4xx or 6xx message.

The mapping module 146c extracts the session mapping identifier from the session negotiation request message received by the receiving module 144a according to the processing of the response of accepting the session negotiation by the response processing module 144b, and checks whether there is a connected session by using the extracted session mapping identifier. In this instance, the mapping module 146c checks whether the extracted session mapping identifier corresponds to the session mapping identifier of the participated session that is checked through the session manager (142 of FIG. 3). Here, when they correspond with each other, the mapping module 146c maps the session that is activated by the received session negotiation request message on the IMS service application unit (120 of FIG. 1) on which the participated session is mapped.

Further, when receiving a plurality of session negotiation request messages, the mapping module 146c checks whether the session mapping identifiers extracted from the respective messages correspond with each other, and whether the respective session mapping identifiers correspond to the session mapping identifier of the participated session, and maps the sessions having the same session mapping identifier on the corresponding IMS service application 120 according to the checking results.

Hence, according to the exemplary embodiment of the present invention, each session includes the session mapping identifier for indicating the connection between the corresponding sessions when a plurality of sessions are generated so as to provide the SIP-based service. When a session is requested, the receiving part must be operated by identifying connection of other sessions through the session mapping identifier.

Further, the session mapping identifier can be inserted into the header field of the message for requesting negotiation on the activated session.

In this instance, according to the first exemplary embodiment of the present invention, the session mapping identifier is inserted into a predefined specific field in the header of the message for requesting the negotiation on the activated session, which will be described with reference to FIG. 6.

Also, according to the second exemplary embodiment of the present invention, the session mapping identifier is inserted into the newly defined header field in the message header for requesting negotiation of a session for the session mapping identifier, which will be described with reference to FIG. 7.

Figure 6:
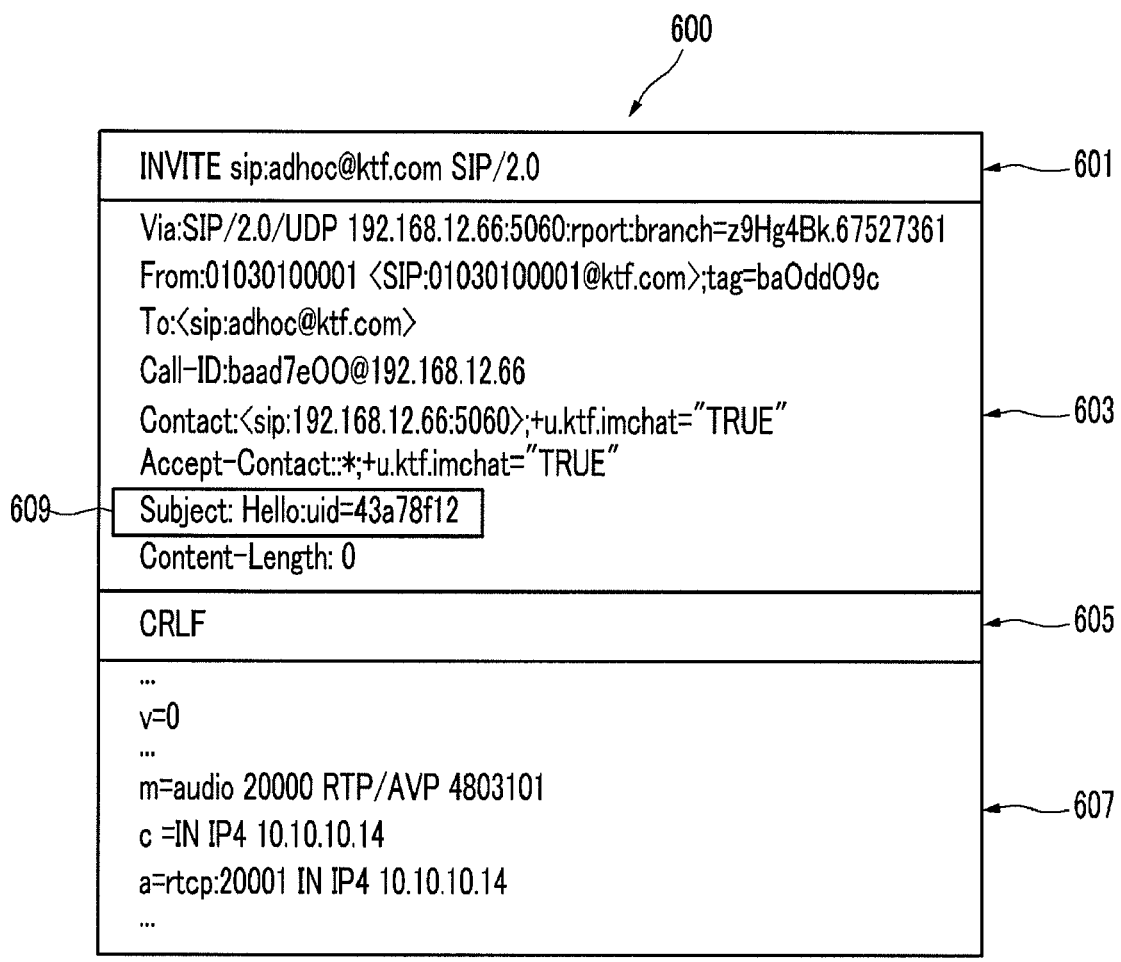
FIG. 6 shows an SIP message for requesting session negotiation according to a first exemplary embodiment of the present invention.

FIG. 6 shows a format of an SIP message for requesting session negotiation according to the first exemplary embodiment of the present invention.

As shown in FIG. 6, the format of an SIP message 600 following the SIP rule includes a start line field 601, a message header field 603, and a message body field 607 that is identifiable from the message header field through a carriage-return line-feed (CRLF) 605.

Here, the start line field 601 includes a method type to be requested, an SIP uniform resource identifier (URI) for indicating an address of a target for receiving the request, and data for the SIP version.

The message header field 603 includes Via, From, To, Call-ID CSeq, Contact, Accept-Contact, Subject, Route, and Content-Length values for controlling the session.

Here, the Subject field 609 is a specific field that is predefined for the session mapping identifier, and a session mapping identifier for indicating a mutual connection state of at least one session is inserted into the Subject field 609.

The session mapping identifier is defined as a mapping ID given as an aid (application ID) defined as 16-nary value. As described above, the session mapping identifier can be a random number or a hash function applied random number, i.e., "43a78f12".

In this instance, since the terminal device using the SIP rule to which the Subject header field into which the session mapping identifier is inserted is not defined ignores it, the terminal device provides compatibility without collision with the existing SIP protocol.

Also, +x.xx.service-identifier recorded in the Contact and Accept-Contact fields is used to identify the corresponding service, and is used to map the session negotiation request on the corresponding service application unit (120 of FIG. 2).

Finally, the message body field 607 for recording information for session negotiation uses the session description protocol (SDP) for controlling the session information receiving part to participate in the session by transmitting media stream information of the corresponding session. The SDP includes a session's name and purpose, a session's activation time, session configuring media, media receiving information, and used bandwidth information. In this instance, characteristic information on the media configuring the session is recorded by using an "m" field, a "c" field, and an "a" field. The "m" field indicates a media name and a transmission address for showing information on the media characteristics. The "c" field indicates session connection information, that is, a media receiving IP address. The "a" field indicates media characteristics information.

Figure 7:
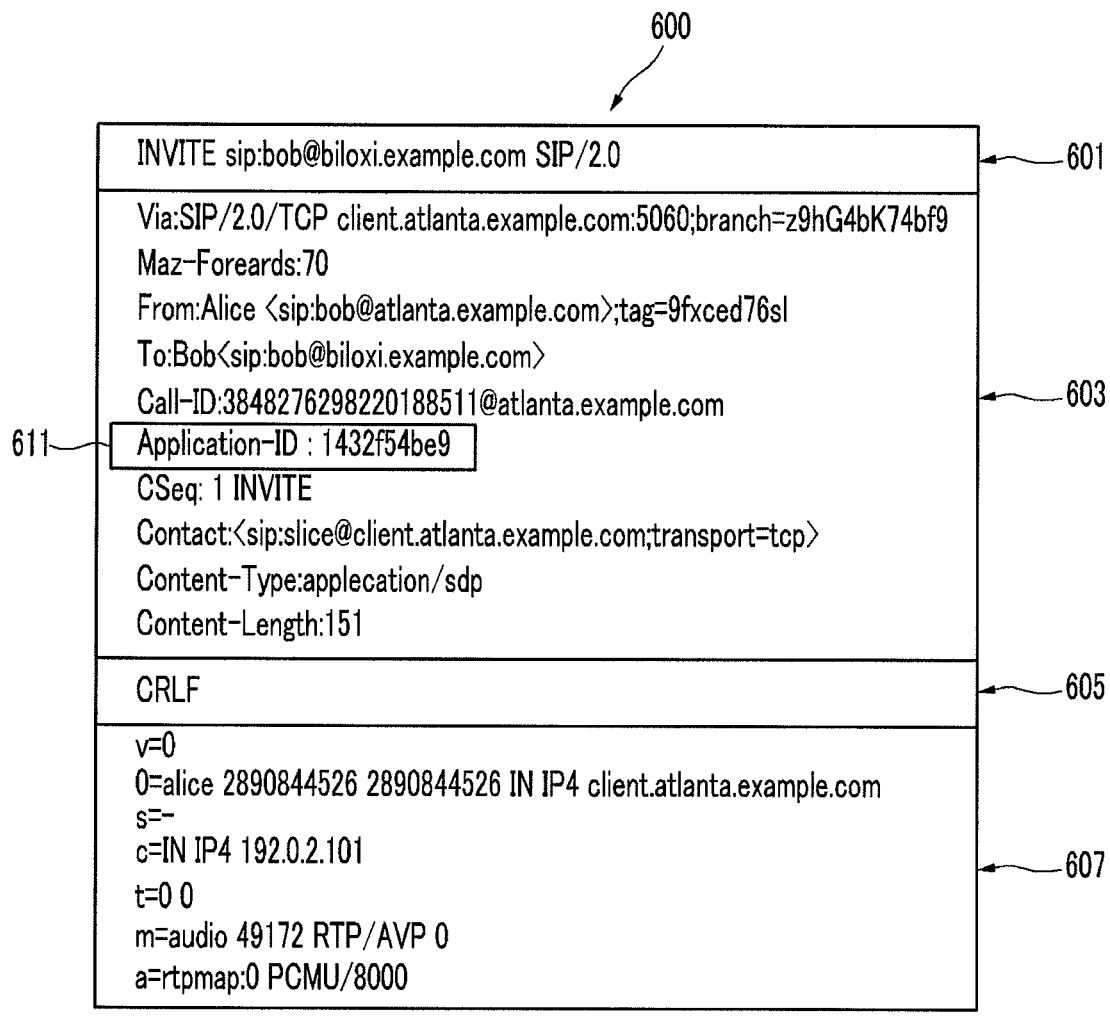
FIG. 7 shows an SIP message format for requesting session negotiation according to a second exemplary embodiment of the present invention.

FIG. 7 shows a format of an SIP message for requesting session negotiation according to a second exemplary embodiment of the present invention.

As shown in FIG. 7, since the default message format is the same as FIG. 6, the same reference numerals are used and no repeated description is provided.

Here, the session mapping identifier is inserted into the newly defined header field in the SIP message header for requesting session negotiation. An Application-ID field 611 can be used as an example of the newly defined header field in the message header as shown in FIG. 7.

The Application-ID field 611 is a field that is newly defined for the existing message format, and it is a newly defined field for the session mapping identifier for indicating a mutual connection state between at least one session. Here, the session mapping identifier uses a random number, that is, the 16-nary value of "1432f54be9" in a like manner of FIG. 6.

Therefore, the session mapping identifier is included in the SIP protocol header to maintain compatibility with the existing protocol.

A method for the above-configured terminal device 100 to transmit/receive an SIP-based session negotiation request will now be described.

Figure 8:
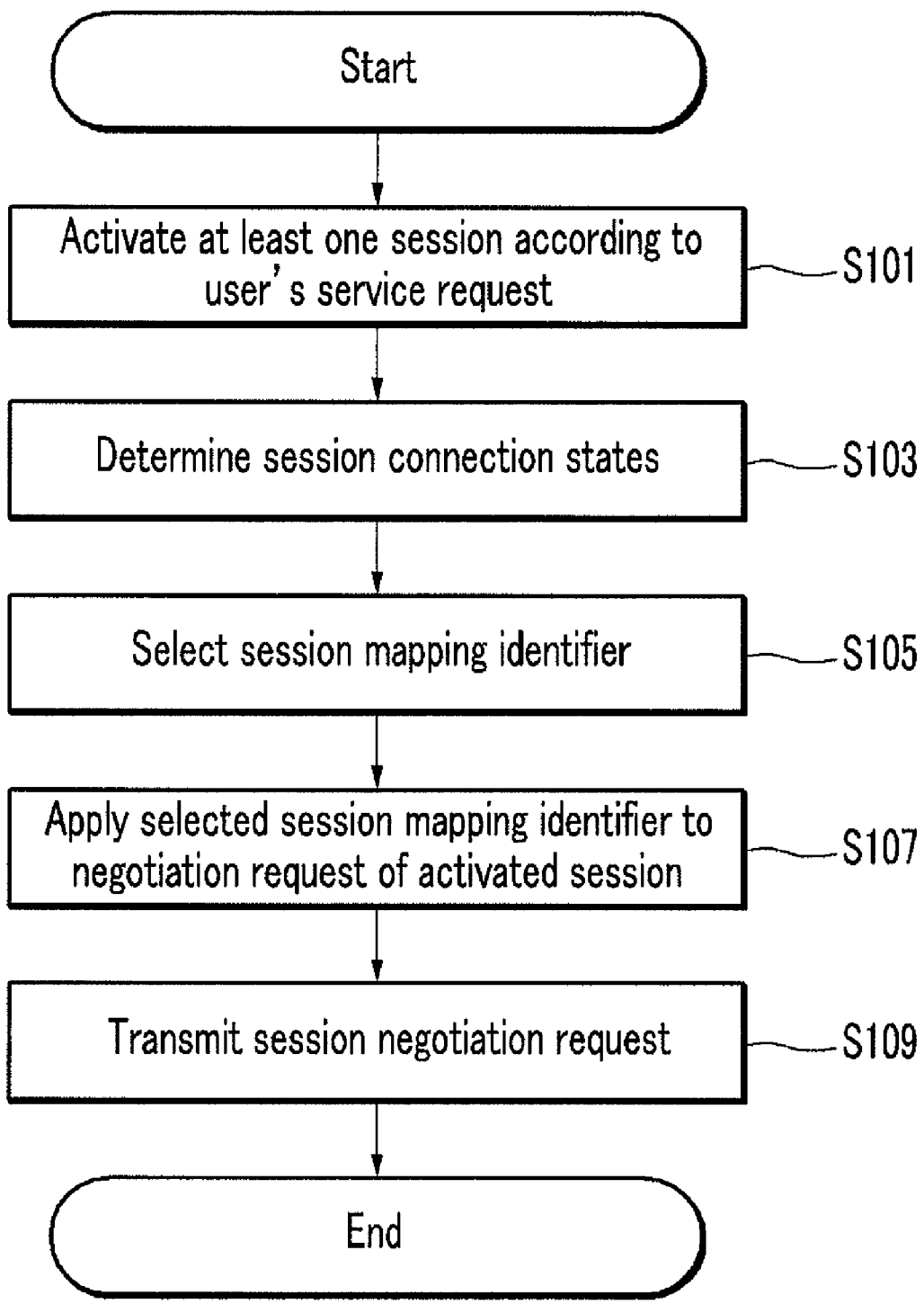
FIG. 8 shows a brief flowchart of processing an SIP-based session negotiation request according to an exemplary embodiment of the present invention.
Figure 9:
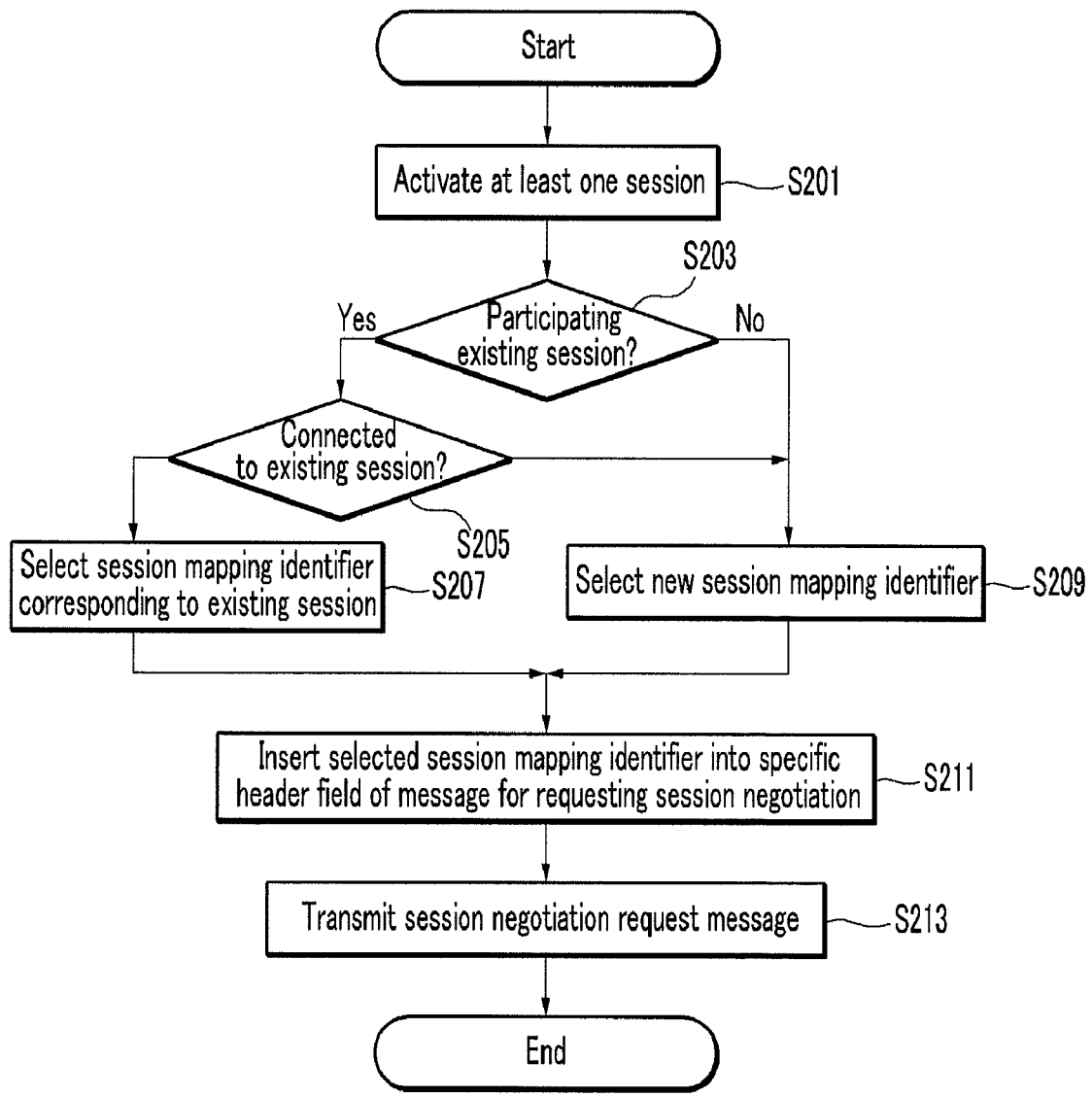
FIG. 9 shows a detailed flowchart of processing transmission of an SIP-based session negotiation request according to an exemplary embodiment of the present invention.

FIG. 8 and FIG. 9 show a session processing operation by the call sending processor 144.

FIG. 8 shows a flowchart of processing SIP-based session negotiation request transmission according to an exemplary embodiment of the present invention.

Referring to FIG. 8, at least one session is activated according to the user's service request (S101). In this instance, the user's service request can be an initial performance request of a single IMS service. Also, the user's service request can be a request for performing respective services defined in various media formats in a single IMS service. Further, the user's service request can be a request for performing a service targeting a specific user.

When the session is activated, a connection state between the activated session and the participated session or a connection state between a plurality of activated sessions is determined (S103).

A session mapping identifier is selected according to the connection state of the session determined in S103 (S105).

The selected session mapping identifier is included in the negotiation request of the activated session (S107) and is then transmitted (S109).

FIG. 9 shows a detailed flowchart of processing SIP-based session negotiation request transmission according to an exemplary embodiment of the present invention.

Referring to FIG. 9, when the session is activated according to the user's service request (S201), it is checked whether there is an existing participated session (S203).

When there is an existing session according to the checking result of the step S203, it is determined whether there is a connection state between the activated session of the step S201 and the existing session (S205).

When the activated session is connected with the existing session according to the checking result of the step S205, the session mapping identifier provided to the existing session is selected as the activated session's session mapping identifier (S207). In this instance, when the activated session indicates a plurality of mutually connected sessions, the session mapping identifier of the existing session is selected for all the activated sessions.

When there is no existing session according to the checking result of the step S203 or when the activated session has no connection with the existing session according to the checking result of the step S205, a new session mapping identifier for the activated session is selected (S209). In this instance, when the activated sessions are plural and are connected with each other, the selected session mapping identifier is identically applied to the plurality of sessions.

Next, the selected session mapping identifier is inserted into a specific header field of the message for requesting session negotiation (S211).

The session negotiation request message into which the session mapping identifier is inserted is transmitted to the desired terminal of the contact (S213).

Figure 10:
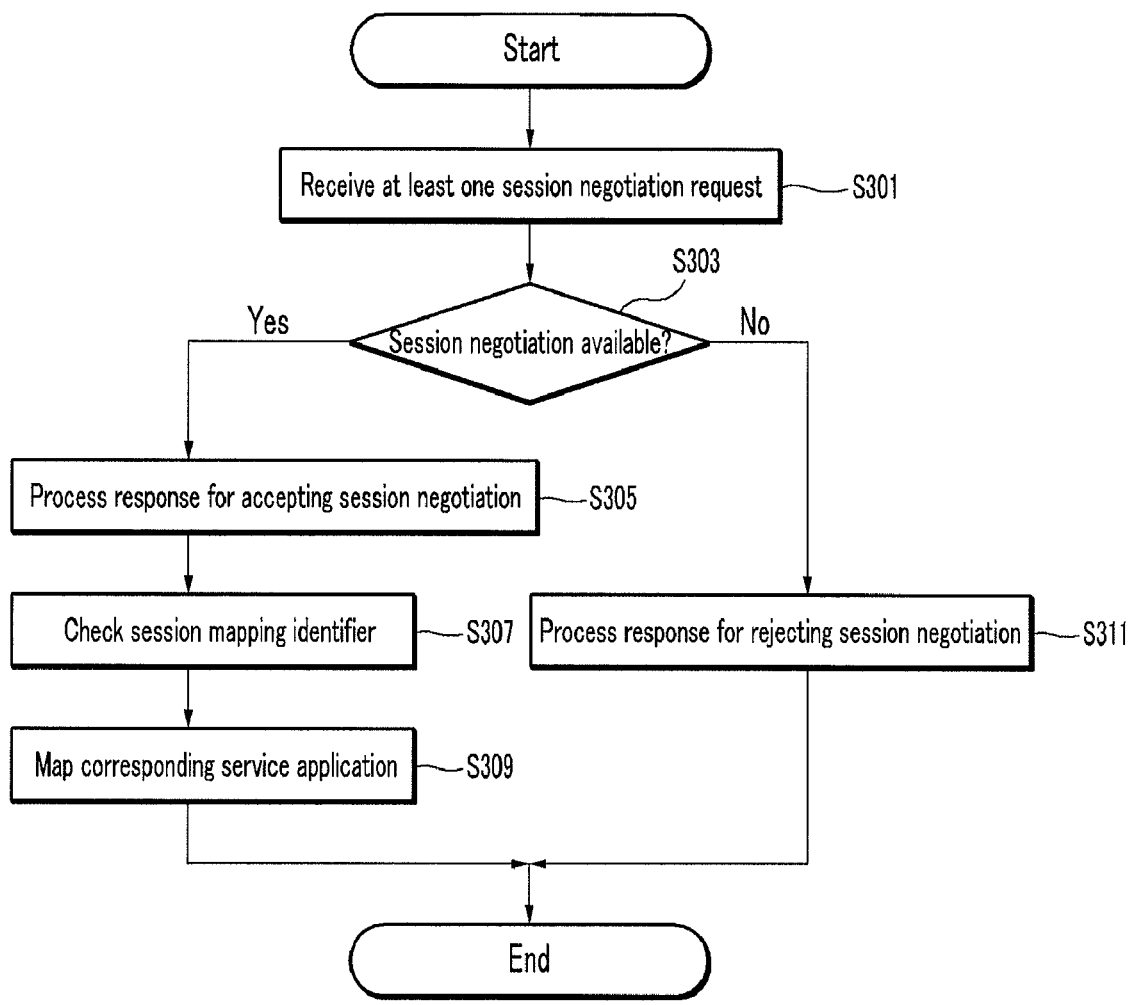
FIG. 10 shows a detailed flowchart of processing receiving of an SIP-based session negotiation request according to an exemplary embodiment of the present invention.

FIG. 10 shows a session processing operation by the call receiving processor 146 shown in FIG. 3 and FIG. 5.

FIG. 10 is a flowchart of processing SIP-based session negotiation request receiving according to an exemplary embodiment of the present invention.

Referring to FIG. 10, when at least one session negotiation request is received (S301), it is determined whether session negotiation is available (S303). That is, it is determined whether to accept information (e.g., media performance information) for a session negotiation request, and it is then determined whether session negotiation is available.

When it is determined that the session negotiation is found to be available in the step of S303, a response process for accepting the session negotiation is performed (S305).

Next, the session mapping identifier included in the session negotiation request received in the step of S301 is checked (S307).

The at least one received session negotiation request is mapped on the corresponding IMS service application by using the session mapping identifier checked in the step of S307 (S309).

Here, when the session mapping identifier of the requested session negotiation corresponds to the session mapping identifier of the existing participated session, it is mapped on the IMS service application of the participated session. Also, when the requested session negotiations are plural and the respective session mapping identifiers are the same, the plurality of received session negotiation requests are mapped on the same IMS service application.

When the session negotiation is found to be unavailable in the step of S303, a response process of rejecting the session negotiation is performed (S311).

An exemplary embodiment of applying the contents that have been described with reference to FIG. 2 to FIG. 10 to an SIP-based instant messenger service will now be described.

Here, the instant messenger service is configured by a complex multimedia service defined with different media formats. For example, the instant messenger service includes a buddy list, chat, video chat, file transmission, and an image share service.

Figure 11:
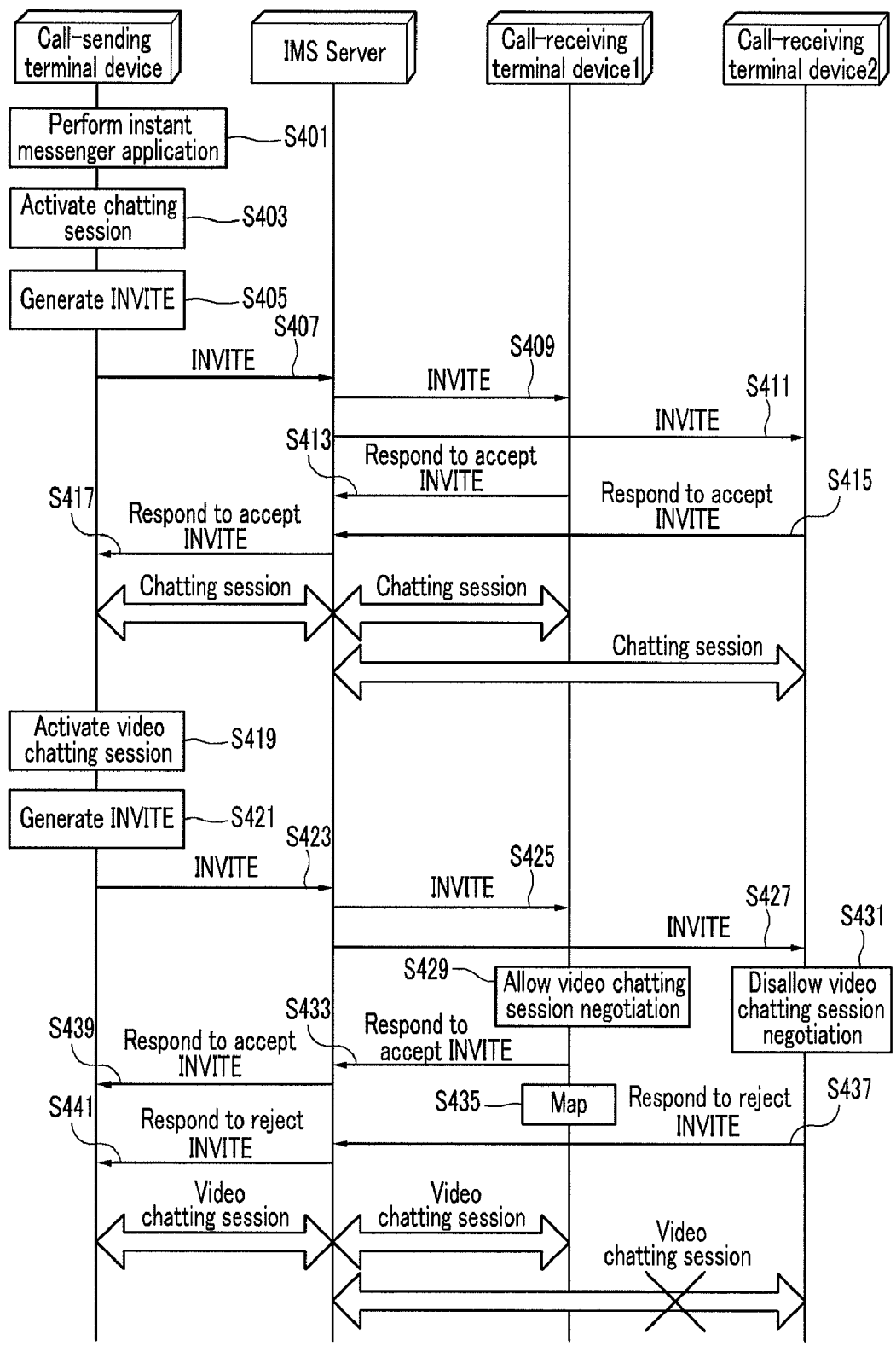
FIG. 11 shows a flowchart of a session negotiation process of an SIP-based instant messenger service according to an exemplary embodiment of the present invention.

FIG. 11 shows a flowchart of a session negotiation process of an SIP-based instant messenger service according to an exemplary embodiment of the present invention.

Referring to FIG. 11, the call sending part's terminal device performs the instant messenger application according to the user's request (S401) to activate a chatting session (S403).

An INVITE message defined as the media format of chatting is generated (S405) and is transmitted to the IMS server (IMS core network) (S407). Here, a session mapping identifier is inserted into the Subject header field of the INVITE message.

The IMS server forwards the INVITE message received in the step of S407 to the terminal device of the corresponding contact, that is, the first call receiving part's terminal device and the second call receiving part's terminal device (S409 and S411). The IMS server receives an acceptance response from the terminal devices of the contacts (S413 and S415) and transmits the same to the call sending part's terminal device (S417).

Here, the briefly described steps of S413, S415, and S417 are performed by transmitting and receiving 183 Session Progress, PRACK, 200 OK, 180 Ringing, and an ACK message between the IMS server and the terminal device of the contact.

Therefore, the call sending part's terminal device establishes a chatting session with the first call receiving part's terminal device and the second call receiving part's terminal device.

After this, a video chatting session is activated by the call sending part's terminal device according to the user's request (S419).

The call sending part's terminal device generates an INVITE message defined as a media format for video chatting (S421). In this instance, since the video chatting session is connected to a finished chatting session, the session mapping identifier of the chatting session is inserted into the header field of the INVITE message generated in the step of S421.

The INVITE message generated in the step of S421 is transmitted to the IMS server (S423), and the IMS server forwards the INVITE message to the first call receiving part's terminal device and the second call receiving part's terminal device (S425 and S427).

In this instance, from among the terminal devices of the contacts having received the session negotiation request of video chatting, the first call receiving part's terminal device is available for session negotiation of video chatting (S429), and the second call receiving part's terminal device is unavailable for session negotiation of video chatting (S431).

Therefore, the first call receiving part's terminal device transmits a response message for accepting the session negotiation of video chatting (S433). Since the session mapping identifier inserted into the header field of the INVITE message received in the step of S425 is the same as the participated chatting session, it is mapped on the instant messenger application that is the corresponding service application of the chatting session (S435).

The second call receiving part's terminal device performs a response process of rejecting the session negotiation request of video chatting (S437).

The IMS server transmits the first call receiving part's terminal device and the second call receiving part's terminal device's response to the video chatting session negotiation request to the call sending part's terminal device (S439 and S441).

Therefore, session negotiation is established with video chatting between the call sending part's terminal device and the first call receiving part's terminal device to thus provide the instant messenger service.

Since the video chatting session negotiation between the call sending part's terminal device and the second call receiving part's terminal device has failed and the existing established chatting session negotiation is valid, the instant messenger service according to the chatting session negotiation can be provided.

Also, though not shown in the drawings, session negotiation of video chatting added during chatting session participation can be requested by designating a terminal device of a specific contact.

Accordingly, since a single service is configured by a plurality of sessions, the session negotiation that is not maintained in a like manner of a file transmission session but is frequently requested and can be easily performed without a complex process of the conventional session re-negotiation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of managing Session Initiation Protocol (SIP)-based sessions in a first device, the first device comprising:

activating a first communication service of an Internet Protocol Multimedia Subsystem (IMS) application at a first user's first request for the first communication service;

assigning a session mapping identifier to a first session for the first communication service;

sending, to a second device of a second user, a first session negotiation request including the assigned session mapping identifier, wherein the first session negotiation request is a first SIP message, wherein the assigned session mapping identifier is inserted into a newly defined field of a header of the first SIP message;

receiving the first user's second request for a second communication service of the IMS application, the second communication service being different from the first communication service, the second request identifying the second user or device;

in response to the second request, activating the second communication service;

assigning the same session mapping identifier to a second session for the second communication service;

sending to the second device a second session negotiation request including the same session mapping identifier, wherein the second session negotiation request is a second SIP message, wherein the same session mapping identifier is inserted into a newly defined field of a header of the second SIP message; and establishing the second session with the second device using the same session mapping identifier.

2. The method of claim 1, further comprising:

receiving the first user's third request for a third communication service of the IMS application, the third request identifying a third user or device;

in response to the third request, activating the third communication service;

assigning the same session mapping identifier to a third session for the third communication service;

sending to the third device a third session negotiation request including the same session mapping identifier, wherein the third session negotiation request is a third SIP message, wherein the same session mapping identifier is inserted into a newly defined field of a header of the third SIP message; and establishing the third session with the third device using the same session mapping identifier.

3. The method of claim 1, wherein the assigned session mapping identifier comprises a random number selected from a random number table.

4. The method of claim 2, wherein the assigned session mapping identifier is generated by a hashing algorithm.

5. The method of claim 1, wherein the newly defined field is a predetermined field.

6. The method of claim 1, wherein each communication service is one selected from the group consisting of text messaging, instant messenger chat, video chat, buddy list, file transmission, video sharing, and image sharing.

7. A method of managing Session Initiation Protocol (SIP)-based sessions in a second device, the method comprising:

running a first session for a first communication service, in a second device in communication with a first device, the first communication service provided by an Internet Protocol Multimedia Subsystem (IMS) application, wherein the first session uses a first session mapping identifier;

receiving, from the first device, a second session negotiation request for establishing a second session for a second communication service of the IMS application, the second communication service different from the first communication service, and the second session negotiation request including a second session mapping identifier, wherein the second session negotiation request is a SIP message, wherein the second session mapping identifier is inserted by the first device into a newly defined field of a header of the SIP message;

activating the second communication service in the second device;

checking to see if the second session mapping identifier is identical to the first session mapping identifier;

if it is determined that the second session mapping identifier is identical to the first session mapping identifier, assigning the identical session mapping identifier to the second session for the second communication service; and establishing the second session using the identical session mapping identifier.

8. The method of claim 7 further comprising:

receiving, from a third device, a third session negotiation request for establishing a third session for a third communication service of the IMS application, the third session negotiation request including a third session mapping identifier, wherein the third session negotiation request is a SIP message, wherein the third session mapping identifier is inserted by the third device into a newly defined field of a header of the SIP message;

activating the third communication service in the second device;

checking to see if the third session mapping identifier is identical to the first session mapping identifier or second session mapping identifier;

if it is determined that the third session mapping identifier is identical to the first session mapping identifier or the second session mapping identifier, assigning the identical session mapping identifier to the third session for the third communication service; and establishing the third session using the identical session mapping identifier.

9. The method of claim 7 further comprising:

determining whether the second communication service of the IMS application is available in the second device, wherein the second communication service is only activated in the second device if it is determined that the second communication service of the IMS application is available in the second device.

* * * * *